United States Patent
Xing et al.

(10) Patent No.: US 8,428,080 B2
(45) Date of Patent: Apr. 23, 2013

(54) METHOD TO CONTROL RECONFIGURATION OF MULTIPLE RADIO ACCESS BEARERS IN A WIRELESS DEVICE

(75) Inventors: Longda Xing, San Jose, CA (US); Li Su, San Jose, CA (US); Jianxiong Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 13/101,785

(22) Filed: May 5, 2011

(65) Prior Publication Data

US 2012/0069750 A1    Mar. 22, 2012

Related U.S. Application Data

(60) Provisional application No. 61/383,725, filed on Sep. 16, 2010.

(51) Int. Cl.
*H04J 3/17*    (2006.01)
(52) U.S. Cl.
USPC .......................................... 370/462; 370/464
(58) Field of Classification Search .................. None
See application file for complete search history.

(56) References Cited

U.S. PATENT DOCUMENTS

| | | | |
|---|---|---|---|
| 7,149,538 B2* | 12/2006 | Lindoff et al. | 455/522 |
| 2003/0171129 A1 | 9/2003 | Sagne | |
| 2004/0049561 A1 | 3/2004 | Tafazolli et al. | |
| 2004/0192318 A1 | 9/2004 | Fisher | |
| 2005/0069044 A1 | 3/2005 | Iacono et al. | |
| 2006/0035642 A1 | 2/2006 | Farnsworth et al. | |
| 2006/0209896 A1* | 9/2006 | Choi et al. | 370/469 |
| 2006/0227736 A1 | 10/2006 | Conyers et al. | |
| 2006/0262719 A1 | 11/2006 | Cao et al. | |
| 2007/0140217 A1* | 6/2007 | Benco et al. | 370/352 |
| 2007/0195815 A1* | 8/2007 | Turner et al. | 370/465 |
| 2007/0291731 A1* | 12/2007 | Lee et al. | 370/350 |
| 2008/0214220 A1 | 9/2008 | Beziot et al. | |
| 2010/0165901 A1 | 7/2010 | Kim | |
| 2011/0235575 A1* | 9/2011 | Tapia et al. | 370/328 |

FOREIGN PATENT DOCUMENTS

GB        2424795        10/2006

OTHER PUBLICATIONS

PCT International Search Report dated Oct. 18, 2011 in PCT Application No. PCT/US2011/045248.
PCT Written Opinion dated Oct. 18, 2011 in PCT Application No. PCT/US2011/045248.

* cited by examiner

*Primary Examiner* — Hassan Kizou
*Assistant Examiner* — Roberta A Shand
(74) *Attorney, Agent, or Firm* — Gazdzinski & Associates, PC (57) ABSTRACT

Methods to control reconfiguration of multiple radio access bearers in a mobile wireless device connected to a wireless network are described. The mobile wireless device is connected to the wireless network through a voice connection and a data connection simultaneously. The data connection is concurrently active with the voice connection. Transmission of one or more signaling messages for the data connection is delayed until the voice connection terminates. Representative signaling messages include messages that reconfigure a radio access bearer supporting the data connection and messages estimated to exceed a pre-determined transmission time interval.

22 Claims, 9 Drawing Sheets

METHOD TO CONTROL RECONFIGURATION OF MULTIPLE RADIO ACCESS BEARERS IN A WIRELESS DEVICE

CROSS-REFERENCE TO RELATED APPLICATIONS

This patent application takes priority under 35 U.S.C. 119 (e) to U.S. Provisional Patent Application Ser. No. 61/383, 725 entitled, "METHOD TO CONTROL RECONFIGURATION OF MULTIPLE RADIO ACCESS BEARERS IN A WIRELESS DEVICE" by Xing et al. filed Sep. 16, 2010 which is incorporated by reference herein in its entirety for all purposes.

TECHNICAL FIELD

The described embodiments relate generally to wireless mobile communications. More particularly, a method is described for controlling reconfiguration of a connection having multiple radio access bearers between a mobile wireless communication device and a wireless communication network.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends from a radio network subsystem located in the cell. The radio network subsystem can include a base transceiver station (BTS) in a Global System for Communications (GSM) network or a Node B in a Universal Mobile Telecommunications System (UMTS) network. Newer mobile wireless communication devices can include the capability of providing several different communication services simultaneously, such as a voice call and data internet browsing at the same time. A separate radio access bearer can be used to transport radio link signals for each of the services between the mobile wireless communication device and one or more radio network subsystems in the wireless network. One radio access bearer can be used for the voice call, and a separate radio access bearer can be used for the data internet browsing. An additional radio access bearer can also be used for signaling messages communicated between the mobile wireless communication device and the wireless network.

From the perspective of a user of the mobile wireless communication device, each of the communication services transported over the separate radio access bearers can be considered independent, and therefore changes to a connection through one radio access bearer should impact minimally connections using a separate radio access bearer. Certain communication protocols, such as the $3^{rd}$ Generation Partnership Project (3GPP) UMTS specifications, can treat a multiple radio access bearer connection as a single connection, resulting in multiple services changed together rather than separately. A reset of a multiple radio access bearer connection due to errors on a data carrying radio access bearer or on a signaling radio bearer can cause a simultaneous voice connection that uses a separate voice carrying radio access bearer to terminate. Loss of the voice connection can be immediately apparent to the user, while loss of the data connection can be perceived as a delay in transmission until the data connection is restored. For mobile wireless communication devices that support simultaneous voice and data connections, it can be preferable to maintain a voice connection even when the simultaneous data connection (or a concurrent signaling connection) can operate with limited performance.

Data usage through wireless communication networks has increased substantially with the introduction of advanced mobile wireless communication devices. As the number of data users has increased, the wireless communication networks can incur congestion and scheduling issues that affect the delivery of data to the mobile wireless communication device. In some situations, a mobile wireless communication device connected simultaneously by a voice connection and a data connection can continue to receive voice signals that can provide intelligible voice over the voice connection when no data or acknowledgements are received from the network over the data connection. The mobile wireless communication device can be configured to retransmit, reset and ultimately terminate the radio link with the wireless communication network when the data connection appears unrecoverable. Terminating the radio link, however, can remove both the data connection and the voice connection, even though the voice connection can be operating properly.

Even when a data connection can provide reliable transmission of data packets, the wireless network can reconfigure the data connection during an active connection to change properties of one or more radio access bearers between the mobile wireless communication device and the wireless access network. Reconfiguration of a radio access bearer can be used to change a transmission data rate to match current usage by the mobile wireless communication device with the wireless access network, effectively providing a dynamic allocation of radio resources based on past, current or predicted usage. Similarly a radio access bearer can be reconfigured between different radio access technologies, or different versions thereof, that can offer different transmission properties and use different processing requirements. Some configurations can consume more power at the mobile wireless communications device than others, and a tradeoff between data transmissions rates for throughput and power consumption for battery usage can be realized by dynamically adapting configuration of the radio access bearers.

Reconfiguration of radio access bearers can be accomplished through a series of messages exchanged between the mobile wireless communication device and a wireless access network. For a connection between the mobile wireless communication device and the wireless access network operating with low quality, such as low received signal code power, an exchange of reconfiguration messages can occupy limited radio resources and be prone to incurring errors, potentially resulting in dropped connections if the reconfiguration messages cannot be received properly within established time limits. Reconfiguration messages can be both long and numerous, and therefore have a higher probability of incurring errors during transmission than relatively shorter signaling messages. While error checking and re-transmission mechanisms can partially compensate for transmission errors to ensure correct reception of signaling messages, strict timeout requirements can result in resets when timely reception of a sequence of signaling messages cannot be completed.

Thus there exists a need to control the reconfiguration of one or more radio access bearers in a multiple radio access bearer connection between a mobile wireless communication device and radio network subsystem in a wireless communication network.

BRIEF DESCRIPTION OF THE DRAWINGS

The invention and the advantages thereof may best be understood by reference to the following description taken in conjunction with the accompanying drawings.

SUMMARY OF THE DESCRIBED EMBODIMENTS

The described embodiments relate generally to wireless mobile communications. More particularly, a method is described for controlling reconfiguration of a connection having multiple radio access bearers between a mobile wireless communication device and a wireless communication network.

In one embodiment, a method for managing radio resources between a mobile wireless device and a wireless network is described. The method includes at least the following steps. A network subsystem in the wireless network detects a voice connection and a data connection between the mobile wireless device and the wireless network, the voice and data connections being active simultaneously. The network subsystem delays transmission of a signaling message for the data connection until the voice connection terminates. In some embodiments the voice and data connections each use separate radio access bearers.

In another embodiment, another method for managing radio resources between a mobile wireless device and a wireless network is described. The method includes at least the following steps. A voice connection is established between the mobile wireless device and the wireless network. Subsequently, a data connection is established between the mobile wireless device and the wireless network, the data connection being configured to support a variable data rate transmission based on a dynamic bandwidth allocation. The wireless network can restrict reconfiguration of the data connection until the voice connection terminates.

In a further embodiment, a non-transitory computer readable medium for storing non-transitory computer program code executed by a processor for controlling radio resources between a wireless network and a mobile wireless device is described. The non-transitory computer readable medium includes at least the following. Non-transitory computer program code for establishing a voice connection between the mobile wireless device and the wireless network. Non-transitory computer program code for establishing a data connection between the mobile wireless device and the wireless network. The data connection is concurrently active with the voice connection. Non-transitory computer program code for estimating a time interval to transmit successfully a signaling message to the mobile wireless device. Non-transitory computer program code for delaying transmission of the signaling message when then estimated time interval exceeds a predetermined transmission time interval and both the voice and data connections remain concurrently active.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
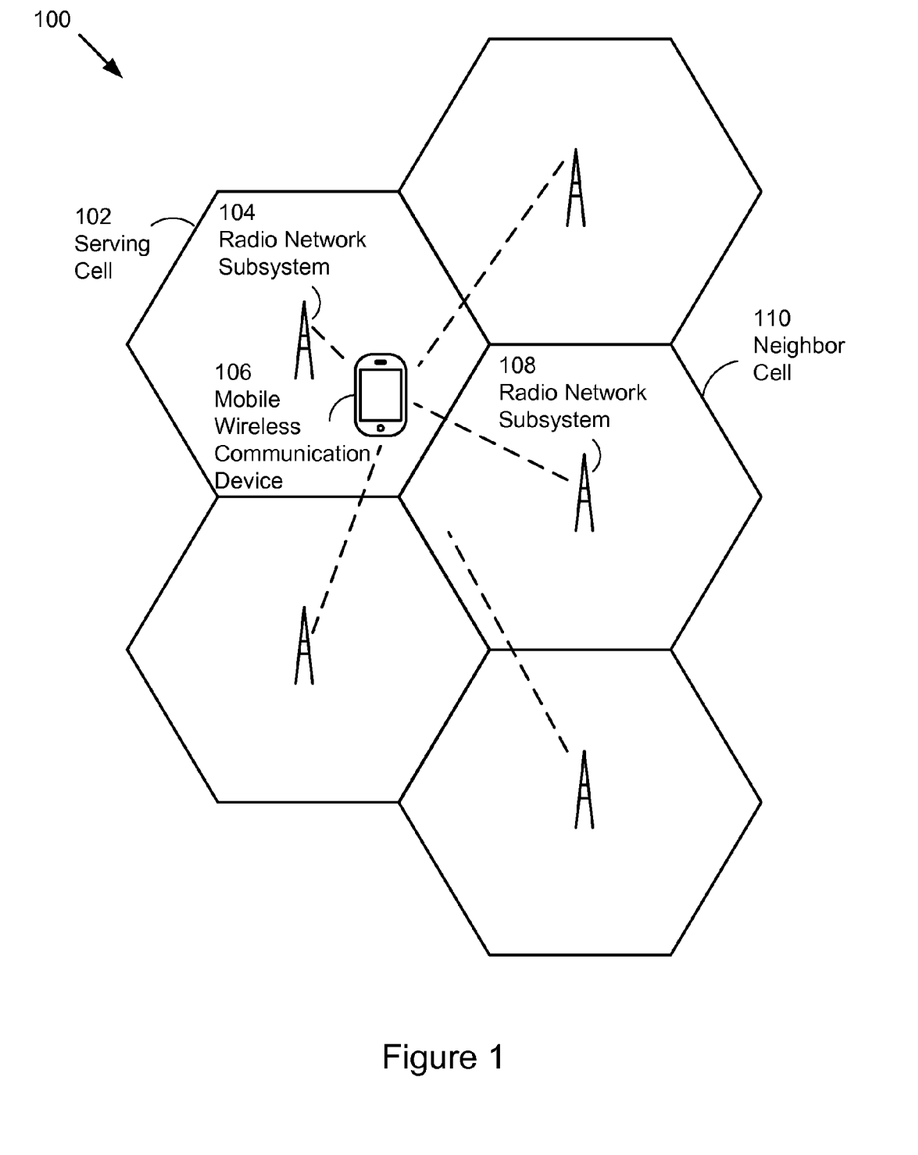
FIG. 1 illustrates a mobile wireless communication device located within a wireless cellular communication network.

FIG. 1 illustrates a wireless communication network 100 of overlapping wireless communication cells to which a mobile wireless communication device 106 can connect. Each wireless communication cell can cover a geographic area extending from a centralized radio network subsystem. The mobile wireless communication device 106 can receive communication signals from a number of different cells in the wireless communication network 100, each cell located at a different distance from the mobile wireless communication device. In a second generation (2G) wireless communication network, such as a network following a Global System for Mobile Communications (GSM) protocol, the mobile wireless communication device 106 can connect to a radio network subsystem in the wireless communication network 100 using one radio link at a time. For example, the mobile wireless communication device 106 can be connected initially to a radio network subsystem (RNS) 104 in a serving cell 102. The mobile wireless communication device 106 can monitor signals from radio network subsystems in neighbor cells. The mobile wireless communication device 106 can transfer its connection from the radio network subsystem 104 in the serving cell 102 to a radio network system 108 in a neighbor cell 110 as the mobile wireless communication device moves within the wireless communication network 100.

In a third generation (3G) wireless communication network, such as a network based on a Universal Mobile Telecommunication System (UMTS) protocol, the mobile wireless communication device 106 can be connected to one or more radio network subsystems simultaneously through multiple radio access bearers. Each of the radio access bearers can transport a different communication service independently, such as a voice service on one radio access bearer and a data service on a second radio access bearer. The mobile wireless communication device 106 can be connected by multiple radio access bearers simultaneously to the radio network subsystem in the serving cell 102 (if the RNS 104 supports such a connection). The mobile wireless communication device can also be connected by a first radio access bearer to the RNS 104 in the serving cell 102 and to a second RNS 108 in the neighbor cell 110 simultaneously. Advanced mobile wireless communication devices, sometimes referred to as "smart" phones, can provide a diverse array of services to the user using a connection with multiple radio access bearers. A user of such a device can converse through a voice connection and surf the internet through a data connection simultaneously.

Figure 2:
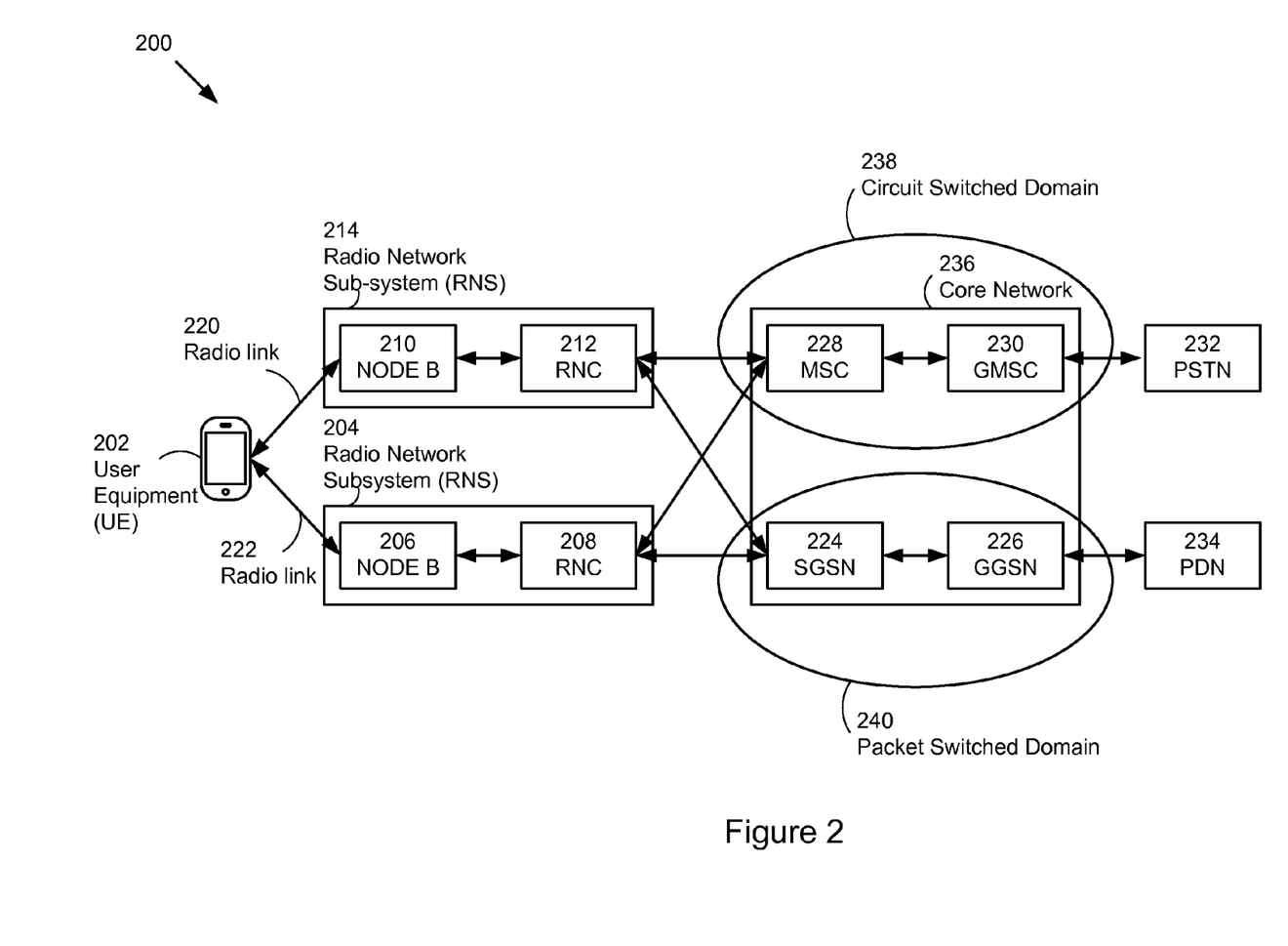
FIG. 2 illustrates a hierarchical architecture for a wireless communication network.

FIG. 2 illustrates a UMTS wireless communication network 200 including UMTS access network elements. The mobile wireless communication device 106 operating in the UMTS wireless communication network 200 can be referred to as user equipment (UE) 202. (Wireless mobile communication devices 106 can include the capability of connecting to multiple wireless communication networks that use different wireless radio access network technologies, such as to a GSM network and to a UMTS network; thus the description that follows can also apply to such "multi-network" devices as well.) In a UMTS wireless network, the UE 202 can connect to one or more radio network subsystems (RNS) 204/214 through one or more radio links 220/222. The first RNS 204 can include a radio access system, known as a "Node B" 206, which transmits and receives radio frequency signals and a radio network controller (RNC) 208 that manages communication between the "Node B" 206 and the core network 236. Similarly the second RNS 214 can include Node B 210 and RNC 212.

Unlike a mobile wireless communication device 106 in a GSM network, the UE 202 in the UMTS network can connect to more than one radio network subsystem simultaneously. Each RNS can provide a connection for a different service to the UE 202, such as a voice connection through a circuit switched voice network and a data connection through a packet switched data network. Each radio link 220/222 can include one or more radio access bearers that transport signals between the UE 202 and the respective RNS 204/214. Multiple radio access bearers can be used for separate services on separate connections or for supplementing a service with additional radio resources for a given connection.

The core network 236 can include both a circuit switched domain 238 that can carry voice traffic to and from an external public switched telephone network (PSTN) 232 and a packet switched domain 240 that can carry data traffic to and from an external public data network (PDN) 234. Voice and data traffic can be routed and transported independently by each domain. Each RNS can combine and deliver both voice and data traffic to mobile wireless communication devices. The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The circuit switched domain 238 and the packet switched domain 240 of the core network 236 can each operate in parallel, and both domains can connect to different radio access networks simultaneously.

The UMTS wireless communication network 200 illustrated in FIG. 2 can support several different configurations in which the UE 202 connects through multiple radio access bearers to the wireless communication network. In a first multiple radio access bearer configuration, a "soft" handoff of the UE 202 can occur between the first RNS 204 and the second RNS 214 as the UE 202 changes location within the UMTS wireless communication network 200. A first radio access bearer through the first RNS 204 can be supplemented by a second radio access bearer through the second RNS 214 before deactivating the first radio access bearer. In this case, multiple radio access bearers can be used for enhancing a connection's reliability, and the UE 202 can typically be using a single service connected through the multiple radio access bearers.

In a second multiple radio access bearer configuration, the UE 202 can connect through the first RNS 204 to the packet switched domain 240 to support a packet data connection and simultaneously connect through the second RNS 214 to the circuit switched domain 238 to support a voice connection. In this case, the UE 202 can maintain a different radio access bearer for each service. In a third configuration, a single RNS can support multiple radio access bearers to the same UE 202, each radio access bearer supporting a different service. For the second and third configurations, it can be preferred that the establishment and release of each radio access bearer be independent as they can be associated with different services simultaneously.

Figure 3:
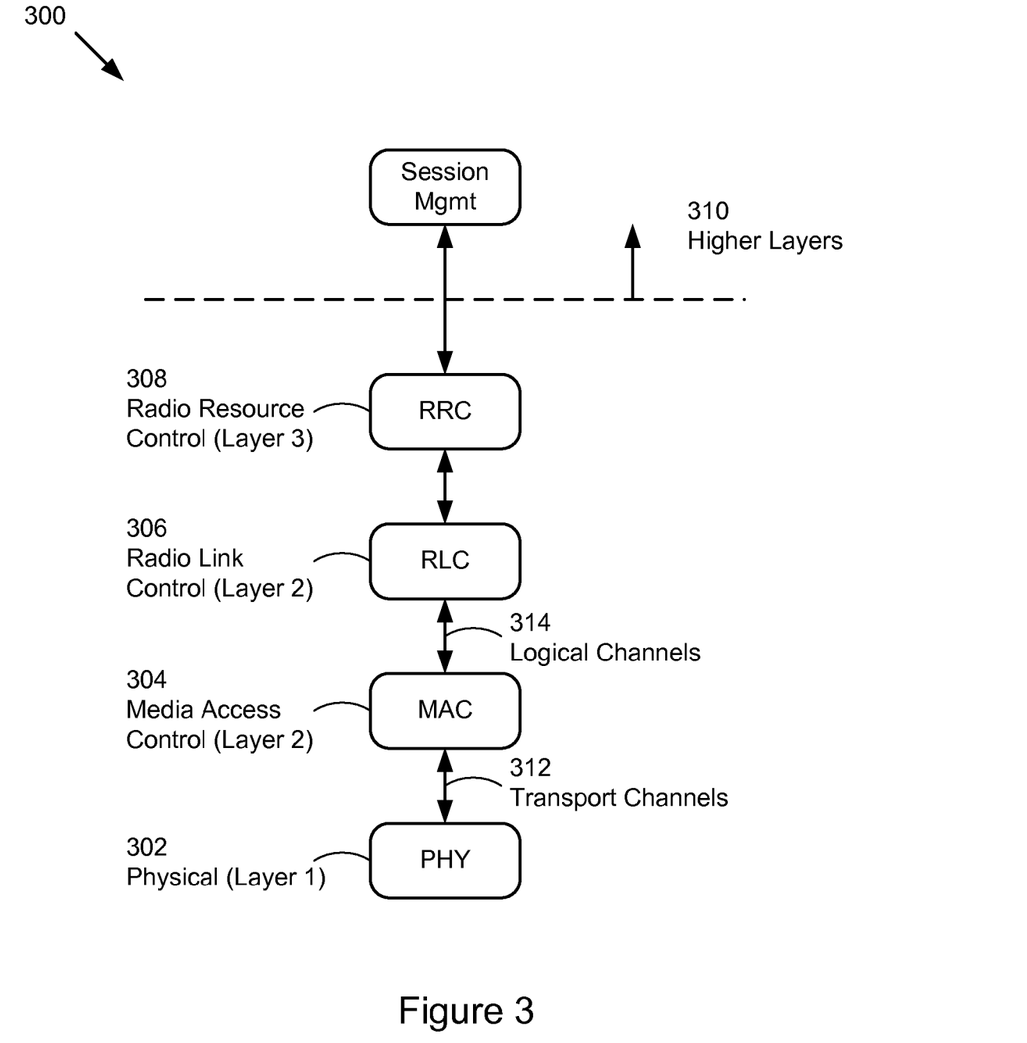
FIG. 3 illustrates a communication protocol stack for a mobile wireless communication device.

FIG. 3 illustrates a layered protocol stack 300 with which a UE 202 can establish and release connections with the UMTS wireless communication network 200 through an exchange of messages. Higher layers 310 in the layered protocol stack 300, such as a session management layer, can request a connection of the UE 202 to the wireless communication network 200. The connection request from the session management layer can result in a series of discrete packetized messages known as radio resource control (RRC) service data units (SDU) passed from an RRC processing block 308 in layer 3 of the protocol stack 300 to a radio link control (RLC) processing block 306 in layer 2 of the protocol stack 300.

A layer 3 SDU can represent a basic unit of communication between layer 3 peers at each end of the communication link. Each layer 3 RRC SDU can be segmented by the RLC processing block 306 into a numbered sequence of layer 2 RLC protocol data units (PDU) for transmission over a communication link. A layer 2 RLC PDU can represent a basic unit of data transfer between layer 2 peers at each end of the communication link. Layer 2 RLC PDUs can be transmitted through additional lower layers in the layer protocol stack 300, namely a media access control (MAC) layer 304 that maps logical channels 314 into transport channels 312 and a physical layer 302 that provides a radio link "air" interface. At the receiving end of the communication link (not shown), the layer 2 RLC PDUs can be reassembled by another RLC processing block to form a complete layer 3 SDU to deliver to another RRC processing block.

The layer 2 RLC protocol can be configured to operate in an acknowledged mode to provide reliable transport of each layer 2 PDU over a noisy transmission channel, such as a wireless communication link. If one or more layer 2 PDUs from a layer 3 RRC SDU are lost during transmission or incorrectly received, the layer 2 PDUs can be retransmitted before reassembling the complete layer 3 RRC SDU. The layer 2 RLC protocol can use an automatic repeat request (ARQ) function to trigger retransmissions. A transmitting layer 2 RLC processing block 306 can receive a status report from a receiving layer 2 RLC processing block. The status report can be sent in response to a poll from the transmitting end or can be automatically sent by the receiving end. Polling of the receiving end can be accomplished by setting a polling bit in a field of a transmitted layer 2 PDU. For example, when a polling bit can be set in a layer 2 PDU having the last sequence number for a particular layer 3 SDU.

The layer 2 processing block at the receiving end can recognize the polling bit and respond to the poll by indicating the highest sequence number layer 2 PDU in the layer 3 SDU for which all layer 2 PDUs equal to or earlier than the highest sequence number have been correctly received. Alternatively, the receiving end can automatically send a status report when a layer 2 PDU is received out of sequence or incorrectly received, thus alerting the transmitting end that a layer 2 PDU has been lost or corrupted during transmission. The transmitting end can respond to the status report by retransmitting any missing layer 2 PDUs. The segmentation and reassembly function with error checking in the transmitting RLC layer 2 processing block 306 can ensure that all layer 2 RLC PDUs in a layer 3 RRC SDU are transmitted and received completely and correctly.

Figure 4:
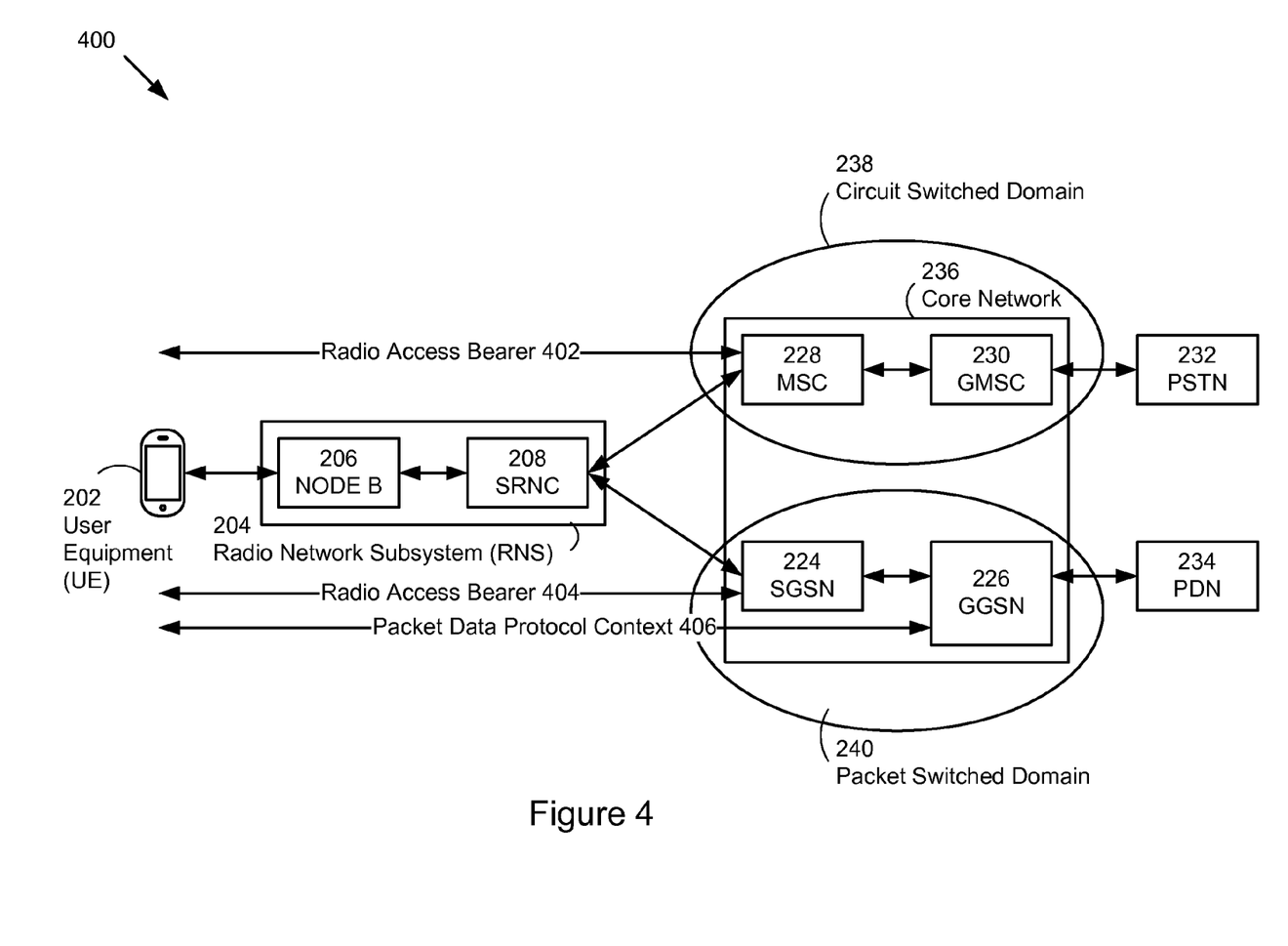
FIG. 4 illustrates a multiple radio access bearer wireless connection including circuit and packet switching.

As illustrated in FIGS. 2 and 4, a UMTS network can include two distinct domains, a circuit switched domain 238 to carry circuit switched traffic (such as voice or transparent data) and a packet switched domain 240 to transport packet data (such as internet connectivity or voice over IP). As shown in FIG. 4, the UE 202 can be simultaneously connected to the circuit switched domain 238 by a radio access bearer 402 to carry voice traffic and to the packet switched domain 240 through a radio access bearer 404 to carry data traffic. A radio access bearer can be considered a channel to transport a circuit switched data stream or a packet switched data stream between the UE 202 and the core network 236 through the RNS 204. The core network 236 can set characteristics of each radio access bearer including data rate and quality of service based on requirements for the data stream transported and on a user's subscription among other criteria.

A packet data protocol (PDP) context 406 can provide a packet data connection between the UE 202 and the gateway GPRS support node (GGSN) 226 to support the exchange of internet protocol (IP) packets using the radio access bearer 404 over the wireless access network portion of the connection. The PDP context 406 can include a PDP address, such as an IP address, for the UE 202. The PDP context 406 can be activated by the UE 202 at the session management layer 310, and the radio access bearer 404 can be established and associated with the PDP context 406 to transport data for the UE 202. Once established, data can be sent as a series of layer 3 SDUs, each layer 3 SDU transported through numbered sequences of layer 2 PDUs as described above for FIG. 3.

As radio frequency spectrum available for use between the UE 202 and the RNS 204 can be limited, the wireless communication network 200 can configure the data carrying radio access bearer 404 to support a particular range of data rates. The choice of data rate for the radio access bearer 404 can depend on multiple factors including but not limited to initial data requests from the UE 202, history of data transmission by the UE 202 (e.g. buffer depths and so-called "happy bits"), estimated and/or measured signal characteristics of a wireless connection between the UE 202 and the RNS 204, and estimates and/or measurements of radio access network loading. The configuration of the data carrying radio access bearer 404 can occur when establishing the PDP context 406 or when allocating one or more radio access bearers 404 for an already established PDP context 406.

After initial configuration, the radio access bearer 404 can also be reconfigured by the wireless communication network through one or more radio bearer reconfiguration (RBR) command messages. Reconfiguration of the radio access bearer 404 can be used by the wireless communication network to de-allocate resources from one UE 202 and to reserve or re-allocate the resources for another UE 202. Reconfiguration can occur as a result of a change in radio access network loading (e.g. number of active users sharing a common radio access link), a change in user data loading (e.g. estimated data bandwidth requirements based on recent usage), a change in signal transmission characteristics of a radio access link (e.g. variation in interference and noise) or as a result of other dynamic characteristics for the radio access bearer 404. Dynamic reconfiguration of one or more radio access bearers 404 can match a limited bandwidth radio access spectrum to dynamic data transfer requirements from multiple users that share the same radio access spectrum to radio network subsystems in the wireless communication network 200.

Each higher layer RBR message can be divided into a sequence lower layer RLC PDUs for transmission across a signaling radio bearer between the UE 202 and the RNS 204. The signaling radio bearer can be separately allocated and maintained from associated data carrying radio access bearers. A throughput data rate for the signaling radio bearer can be fixed and relatively low compared to data rates provided to its associated data bearing radio access bearers. For relatively long higher layer RBR messages, the sequence of lower layer RLC PDUs can be substantial, e.g. 15-25 PDUs. Each lower layer RLC PDU can take upwards of 40 ms to transmit on a relatively low data rate signaling radio bearer, and thus a single RBR message can require nearly one second for a complete transmission.

Signal strengths on connections between the UE 202 and the RNS 204 can be weak at times, and thus transmissions errors can occur when sending the RBR message. Some messages, such as those used to establish and release a connection, can be relatively short, e.g. one RLC PDU long; while radio bearer reconfiguration messages can be relatively long and can encounter more opportunities for failure. Even with re-transmission available to correct for transmission errors of constituent RLC PDUs in a signaling message, timers can expire when a signaling message transmission takes too long to complete. When multiple retransmissions are not successful, the radio network subsystem 204 can conclude that the transmission link to the UE 202 is unreliable and uncorrectable. The radio network subsystem can tear down the faulty connection in order to re-establish a functioning link.

Expiration of the timers and tear down of the link, however, can cause a release of not only the data carrying radio access bearer 404 undergoing re-configuration but also any other concurrent radio access bearers existing between the UE 202 and the wireless communication network, such as a voice carrying radio access bearer 402. Thus, reconfiguration of a data connection (particularly one with weak signal characteristics) can cause a simultaneous voice connection to drop, which can be immediately perceived by the user of the UE 202. The voice connection, which can require relatively limited data rates to function properly, can function properly during weak or highly variable signal conditions that can cause a relatively higher data rate signaling connection to be faulty. To preserve a voice connection, it can be preferred to minimize sending any long signaling messages that pertain to a parallel data carrying radio access bearer 404 when a voice carrying radio access bearer 402 is established and in use simultaneously. Initial configuration of the data carrying radio access bearer 402, or subsequent reconfiguration after having been established, can account for any concurrent voice connections between the UE 202 and the wireless communication network.

Different versions (or releases) of a communications protocol can use radio access bearers having different properties. Radio access bearers for the initial "release 99" version of UMTS can support packet switched data connections up to 384 kbit/s. A data rate allocated to a "release 99" radio access bearer can be established during initialization and changed by reconfiguration while active. Subsequent versions of UMTS, referred to as "release 5" and "release 6" of UMTS, include high speed packet access (HSPA) capabilities for downlink and uplink directions respectively. Data rates supported using HSPA radio access bearers can be substantially higher than those supported using "release 99" radio access bearers. In addition, an HSPA wireless communication network can dynamically assign bandwidth for an HSPA radio access bearer without using radio bearer reconfiguration messages.

A wireless communication network can support multiple versions of UMTS simultaneously to remain backwards compatible with existing equipment already in use in the field. The UMTS communication protocol can permit establishing "release 99" radio access bearers or HSPA radio access bearers in each direction independently. An established radio access bearer can also be reconfigured by the wireless communication network, changing from an HSPA radio access bearer to a "release 99" radio access bearer. In particular, inactivity on an established data connection through a radio access bearer can cause the network to downgrade the radio access bearer. Downgrading can include reconfiguring from an HSPA radio access bearer to a "release 99" radio access bearer and decreasing a data rate allocated to a "release 99" radio access bearer. The wireless communication network can choose to conserve network resources by lowering the data rate allocated to radio access bearers used over connections between the UE 202 and the wireless communication network when possible.

For connections between the UE 202 and the wireless communication network that only use data carrying radio access bearers 404 without a simultaneous voice carrying radio access bearer 402, a reconfiguration of one or more of the data carrying radio access bearers 404 to match a user's data activity can have minimal impact. Even if the data carrying radio access bearers 404 can be disconnected and require re-establishment because of poor transmission quality on a parallel signaling radio access bearer, the user can simply perceive a delay in data transfer. Services that can operate with delays, such as surfing the internet or reading email, can tolerate connection interruptions. For connections between the UE 202 and the wireless network that include a simultaneous voice carrying radio access bearer 402, dropping the data connections (which can result in simultaneously dropping the voice connection) can be immediately obvious to the user of the UE 202. As the wireless communication network can be aware of simultaneous voice carrying radio access bearers 402 and data carrying radio access bearers 404 between itself and the UE 202, the wireless communication network can delay or restrict reconfiguration of the data carrying radio access bearers 404 while the voice carrying radio access bearer 402 is actively connected.

In some embodiments, delay or restriction of reconfiguration of data carrying radio access bearers 404 can depend on one or more measured signal transmission qualities of the connection between the UE 202 and the RNS 204 in addition to the presence of a simultaneous voice carrying radio access bearer. Representative signal transmission qualities of wireless communication networks that can be measured include received signal code power (RSCP), received signal strength indicator (RSSI) and received energy per chip of a pilot channel divided by total noise/interference (EcIo). When one or more measured signal transmission qualities are lower than pre-determined threshold values, reconfiguration of data carrying radio access bearers (or any other lengthy signaling messaging that can incur transmission errors and cause a release of both the data carrying radio access bearers and simultaneous voice carrying radio access bearers) can be restricted or delayed until transmission signal quality improves when the simultaneous voice carrying radio access bearer is active.

Figure 5:
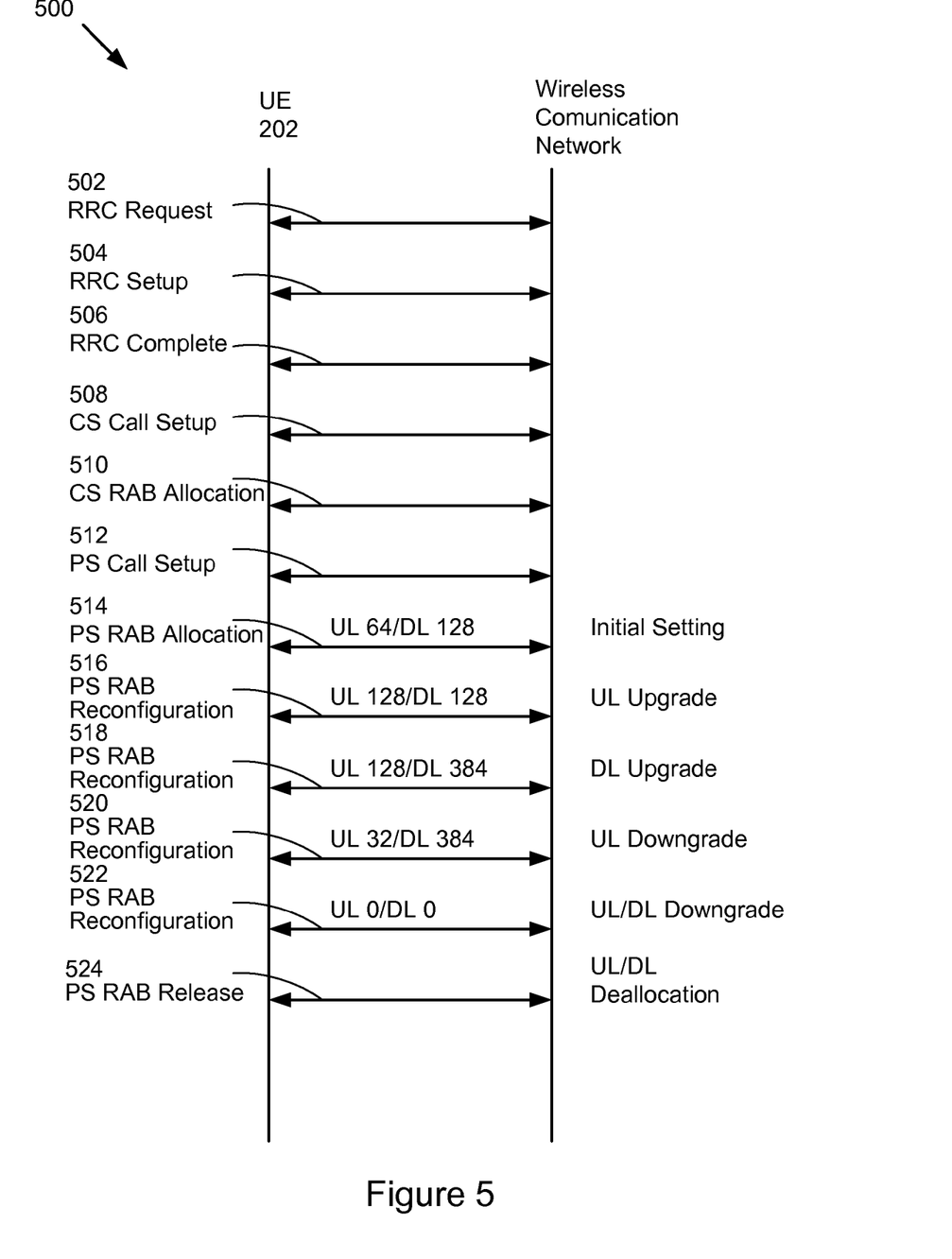
FIG. 5 illustrates a multiple radio access bearer (MRAB) connection setup, reconfiguration, and release between user equipment (UE) and elements of a wireless communication network.

FIG. 5 illustrates an exchange that can occur during a multiple radio access bearer (MRAB) connection setup, reconfiguration, and release between a user equipment (UE) 202 and elements of a wireless communication network. To simplify the diagram shown in FIG. 5, multiple individual commands that can be sent between the UE 202 and the wireless communication network to execute an operation are represented in some cases as a single bi-directional exchange. Individual elements of the wireless communication network that can send and receive signaling commands are not shown explicitly.

Initially, a higher layer radio resource control (RRC) connection request 502 can be sent by the UE 202 or by the wireless communication network to establish a higher layer signaling connection. The RRC connection can be subsequently set up 504 and completed 506. After establishment of the higher layer RRC signaling connection, a circuit switched (CS) voice connection can be set up 508 and a voice carrying CS radio access bearer (RAB) can be allocated 510 by the wireless communication network. After establishment of the CS connection, a packet switched (PS) data connection can be subsequently requested and set up 512. Establishing the PS data connection can be initiated by the UE 202, e.g. the user sending data to establish an internet browsing session, or by the network, e.g. to push an email notification to the UE 202. A PS radio access bearer can be allocated 514 with an initial data rate assigned. The initial data rate can be chosen by the network based on one or more factors, such as a requested data rate by the UE 202, an indication of transmission buffer fullness at the UE 202, a measure of transmission channel capacity between the UE 202 and the RNS 216 or an estimate of data traffic loading for multiple UEs 202 served by the same RNS 216 among others. In FIG. 5, the PS radio access bearer can be assigned a downlink (DL) data rate of 128 kbit/s and an uplink (UL) data rate of 64 kbit/s.

After establishment of the PS connection between the UE 202 and the wireless communication network, the network can choose to reconfigure the PS connection by "downgrading" the data carrying PS radio access bearer. Reconfiguration of the PS RAB can be initiated by the wireless communication network based on changes to any of several factors, including those used to set the initial data rate of the PS RAB when establishing the PS RAB. For example, inactivity over the PS connection for a period of time can result in the wireless communication network perceiving that resources can be de-allocated from the UE 202 and can be re-allocated to another user or can be reserved for future allocation. Alternatively, messages can be sent by the wireless communication network to "upgrade" the PS connection in order to accommodate additional data generated by the UE 202 or originating from the wireless communication network.

As shown by the sequence in FIG. 5, the initial PS RAB can be allocated as a "release 99" RAB having a data rate capacity of 64 kbit/s in the uplink (UL) direction and 128 kbit/s in the downlink (DL) direction. The data rate capacity in each direction, uplink and downlink, can be reconfigured separately using reconfiguration commands. As a result of a change in data activity or pending data or other transmission characteristics, the PS RAB can be upgraded by a PS RAB reconfiguration 516 message (or sequence of messages) to a higher 128 kbit/s data rate capacity in the UL direction. The upgraded PS RAB can accommodate additional UL data generated by the user of the UE 202. Subsequently, the PS RAB can be upgraded again by another PS RAB reconfiguration 518 to a higher 384 kbit/s data rate capacity in the DL direction to carry more DL data generated by the wireless communication network. After a period of inactivity in the UL direction, the wireless network can downgrade the PS RAB using the PS RAB reconfiguration 520 to a lower 32 kbit/s data rate capacity in the UL direction. With continued inactivity in both the UL and DL directions, the wireless network can effectively downgrade the PS connection entirely to a 0 kit/s data rate capacity in both the UL and DL directions using the PS RAB reconfiguration 522. Alternatively, the wireless network can release the data carrying RAB 524 entirely by de-allocating its resources.

Each of the reconfiguration commands illustrated in FIG. 5 can require a sequence of RLC PDUs that extend over a significant time period and can be prone to errors in reception as described earlier. If the signaling connection between the UE 202 and the wireless communication network is weak and vulnerable to transmission errors, then any of the upgrade, downgrade or release reconfiguration messages can be lost or corrupted. If the wireless network cannot complete the reconfiguration properly, then both the data carrying PS connection and a simultaneous voice carrying CS connection between the UE 202 and the wireless communication network can be released by the wireless network. Thus it can be preferred to restrict or delay any reconfiguration or release messages for a data carrying PS connection until a concurrent voice carrying CS connection is released first.

Figure 6:
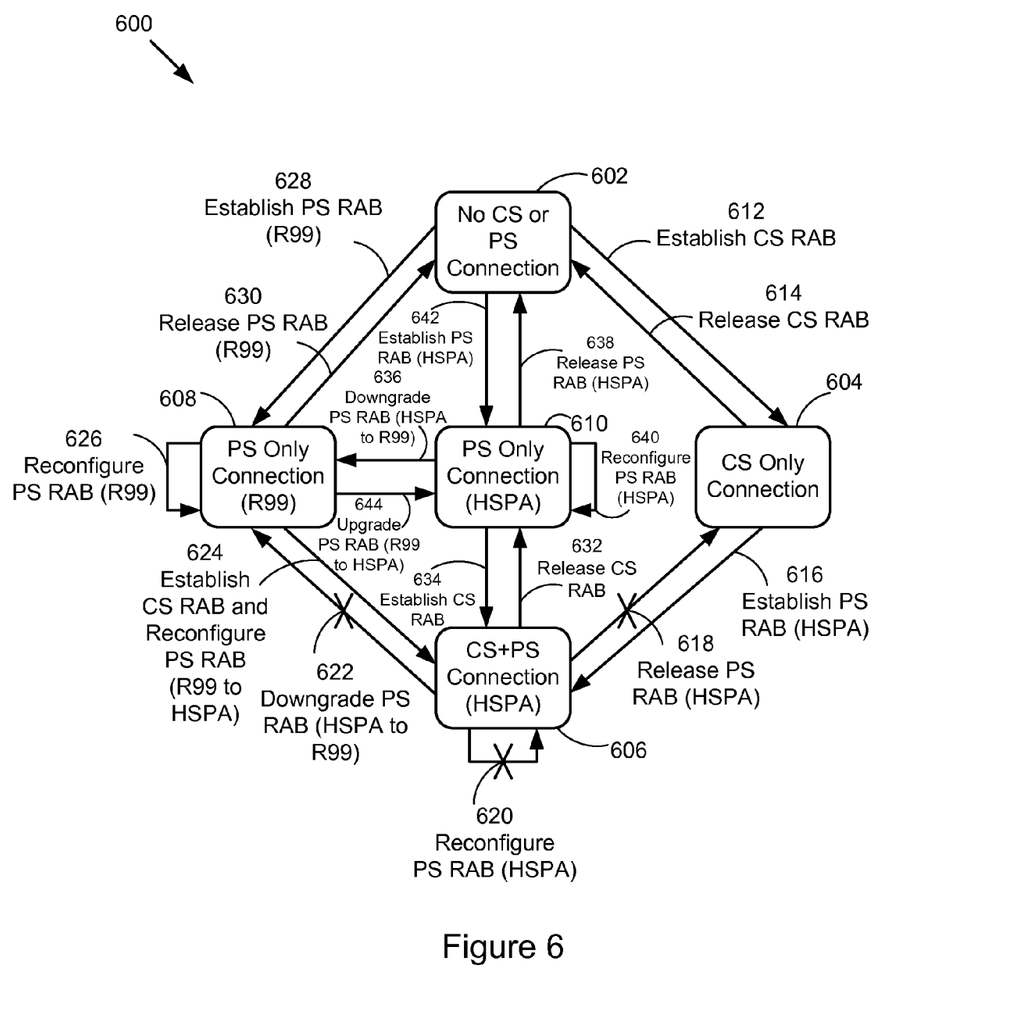
FIG. 6 illustrates a state transition diagram with allowed and disallowed transitions for MRAB reconfiguration.

FIG. 6 illustrates a state transition diagram 600 for a UE 202 connected in various radio access bearer configurations to a wireless communication network. The state transition diagram 600 includes state transitions that can be allowed and also state transitions that can be disallowed to improve call stability. Initially, in state 602, no voice CS or data PS connection can exist between the UE 202 and the wireless communication network. The UE 202 can transition to having a CS only connection in state 604 by establishing a CS radio access bearer through state transition 612. (Request, setup, allocation, configuration and any other steps necessary to establish the CS only connection can be implicitly included in the state transition 612.) When in the CS only connection 604 state, the UE 202 or the wireless communication network can release the CS radio access bearer (state transition 614) to return to a no connection state 602. If the UE 202 or the wireless communication network establishes a data carrying radio access bearer to support a data PS connection while a voice CS connection is active, then an HSPA RAB can be established as shown by state transition 616. (An HSPA RAB can be preferred to a Release 99 RAB for the PS data connection during a simultaneous CS and PS connection.) The UE 202 can then be connected to the wireless communication network simultaneously through a CS connection for voice and a HSPA PS connection for data (state 606).

Once in the combined CS and PS connected state 606, a release or reconfiguration of the HSPA PS radio access bearer can be disallowed to improve call stability. This disallowance can be predicated on a determination of the UE 202 capabilities, by a request from the UE 202 to the wireless communication network, or on an estimate of the quality of the transmission channel between the UE 202 and the wireless communication network. Thus is some cases, certain disallowed transitions can be prohibited in the combined CS and PS connected state 606, such as when signal quality conditions are poor and reconfiguration messages can be prone to errors. In other cases, the one or more of the "disallowed" transitions can be allowed, such as when signal quality conditions are excellent and reconfiguration messages can be expected to be received with a low probability of error. Alternatively, the disallowance can be set irrespective of radio access network transmission quality conditions.

Certain state transitions in the CS and PS connected state 606 can be conditionally (or unconditionally) prohibited as described above. A release of the HSPA PS radio access bearer can be not allowed as indicated by crossed out state transition 618. Similarly a reconfiguration of the HSPA PS radio access bearer can be not permitted as shown by the crossed out state transition 620. A downgrade of the HSPA PS radio access bearer to a "release 99" PS RAB can also be not permitted as indicated by the crossed out state transition 622. Instead, the UE 202 and the wireless network can wait to realize any changes to the HSPA PS radio access bearer until after the voice CS radio access bearer is released through state transition 632.

The CS radio access bearer can be released as shown by state transition 632, resulting in a data carrying HSPA PS connection only state 610. Alternatively, an HSPA PS RAB can be established by the UE 202 and the wireless communication network from the "no connection" state 602 transitioning to the HSPA PS connection only state 610 via state transition 642. Once in the HSPA PS only connection state 610, the UE 202 and the wireless communication network can downgrade the PS radio access bearer from HSPA to R99 as shown by state transition 636. As no voice CS connection can be active in the HSPA PS only connection state 610, an exchange of reconfiguration messages to realize a downgrade of the PS radio access bearer cannot impact a non-existent voice call. Similarly in the HSPA PS only connection state 610, the HSPA radio access bearer can be reconfigured as shown by state transition 640. When in the HSPA PS only connection state 610, the HSPA PS radio access bearer can also be released as shown by state transition 638 to the no connection state 602. If the UE 202 and the wireless communication network add a CS radio access bearer transitioning from the HSPA PS only connection state 610 to the CS and HSPA PS connection state 606 (via state transition 634), then a downgrade, release or reconfiguration of the PS HSPA RAB can again be conditionally prohibited.

If a "release 99" PS radio access bearer is established from the "no connection" state 602, as shown by state transition 628, then the UE 202 can be connected to the wireless network in a "release 99" data carrying PS connection only state 608. As in the HSPA PS only state 610, the data carrying PS radio access bearer can be reconfigured (state transition 626) or released (state transition 630) without impacting any non-existent voice connections. The PS radio access bearer can also be "upgraded" from a "release 99" RAB to an HSPA RAB by state transition 644.

If a voice CS connection is established after a data carrying release 99 PS connection is established, e.g. establishing a voice call starting from the R99 PS only connection state 608, then preferably the release 99 radio access bearer can be reconfigured to an HSPA radio access bearer when establishing the CS radio access bearer for the voice call (state transition 624). While "release 99" PS connections can realize low power consumption at the UE 202 to conserve battery power, once a CS voice connection is active, the power savings for an "inactive" data connection can be less important than guaranteeing call stability for the concurrent voice connection. Once in a combined CS and HSPA PS connection (state 606) the HSPA connection can remain active without impacting network radio resources, as uplink transmissions can occur only when data exists to send and when access grants from the wireless communication network are received by the UE 202. Without data to send, the uplink HSPA PS connection can be idle but ready for transmission. By using the HSPA PS radio access bearer with dynamic bandwidth allocation, rather than a fixed bandwidth data rate "release 99" radio access bearer when in the combined CS voice and PS data connection (state 606), reconfiguration of the PS data radio access bearer can be delayed without penalty to the network and with improved call stability for the combined CS voice and PS data connection.

Restriction of the use of certain state transitions, such as downgrade 622, reconfiguration 620 and release 618, as shown in FIG. 6 can depend on additional conditional factors. For example, when connected to the UE 202, the wireless network can monitor signal quality between the UE 202 and the wireless access portion of the wireless network. When the downlink signal quality, uplink signal quality, or both signal qualities fall below a pre-determined signal quality threshold, the wireless network can restrict changes to the data connection resources as shown in FIG. 6. When one or more of the signal qualities exceeds the pre-determined signal quality threshold (or a second higher pre-determined signal quality threshold), the wireless network can use one or more of the restricted state transitions, such as reconfiguration 620, as the probability of errors in transmission of the signaling message can be quite low.

Signaling messages that can affect a simultaneous voice and data connection can be restricted, delayed or denied under various conditions as described above. In some cases, certain signaling messages can be delayed when the UE 202 is connected to the wireless network in one or more states. In addition, which signaling messages to delay by the wireless network can depend on properties of the signaling message, such as its intended effect on a data connection, voice connection or both. Whether to delay a signaling message can also depend on an estimate of a transmission time required to transmit the entire signaling message to the UE 202. Short messages, such as those that can require only one link layer protocol data unit to transmit can be allowed, while longer messages, such as those that require more than a pre-determined number of link layer protocol data units to transmit can be restricted or delayed. The "length" of transmission of the signaling message can be estimated or measured by a number of constituent protocol data units or a transmission time or another appropriate measure. The estimated or measured "length" can be used to determine whether to delay the signaling message when the UE 202 and the wireless network are connected in certain states, such as during a simultaneous voice and data connection.

Figure 7:
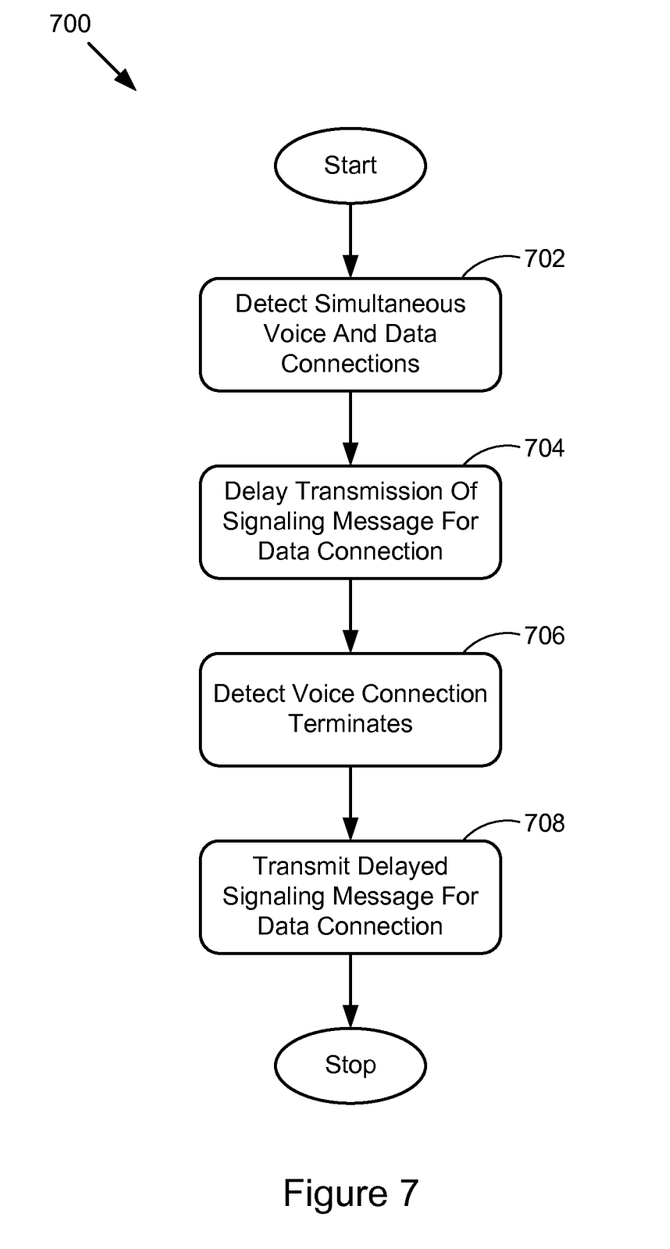
FIGS. 7, 8 and 9 illustrate representative methods for managing radio resources between a mobile wireless device and a wireless network.

FIG. 7 illustrates a representative method 700 to manage radio resources between a mobile device and a wireless network. A network element, such as a radio network subsystem, in a wireless network can detect a simultaneous voice connection and data connection between the mobile device and the wireless network as indicated by step 702. Each of the voice connection and data connection can use separate radio resources on which to transport signals between the mobile device and the wireless network. Signaling for the voice and data connections can also use radio resources separate from radio resources used to transport the voice and data. While the mobile device and the wireless network are connected by the simultaneous voice and data connection, one or more signaling messages can be delayed for transmission by the wireless network as shown in step 704. In step 706, the network element in the wireless network can detect that the voice connection terminates. Subsequently, in step 708, the signaling message delayed by the wireless network can be transmitted to the mobile device. In some embodiments, whether to delay the signaling message can depend on a signal quality of connections between the mobile device and the wireless network. Higher signal quality can permit transmission of the signaling message without delay, while lower signal quality can restrict transmission of the signaling message until the voice connection terminates or the signal quality improves. In some embodiments, whether to delay the signaling message can depend on the type of signaling message. Certain signaling messages that can affect the configuration of the voice connection or the data connection can be delayed, while other signaling messages can be allowed. In some embodiments, whether to delay the signaling message can depend on an estimate of the time to transmit the signaling message to the mobile device. Signaling messages that require multiple protocol data units to transmit can be delayed, while other signaling messages that require only one protocol data unit can be transmitted. Alternatively, signaling messages that can require a transmission time greater than a time interval threshold can be delayed, while other signaling messages that require a short transmission time interval can be permitted.

Figure 8:
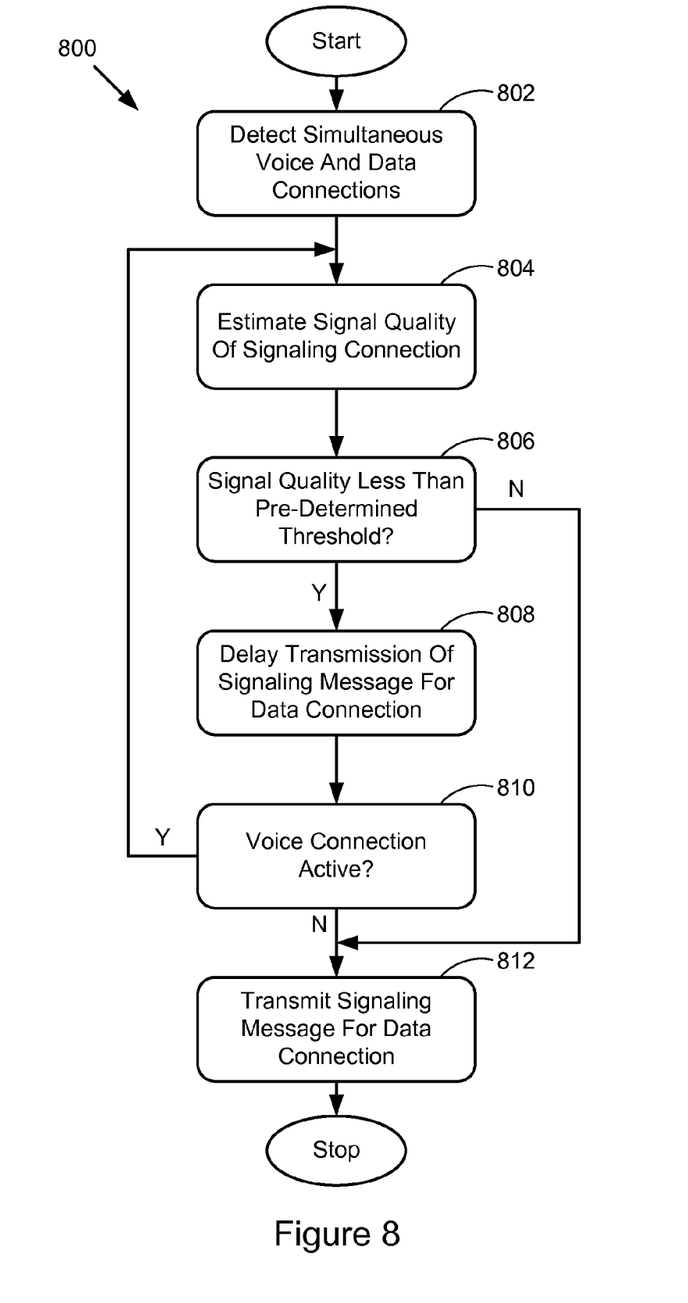

FIG. 8 illustrates a second method 800 to manage radio resources between the mobile device and the wireless network. In step 802, a network element in the wireless network can detect simultaneous voice and data connections between the mobile device and the wireless network. Each of the voice and data connections can use separate radio resources. In step 804, a signaling connection associated with the simultaneous voice and data connection can be estimated (or measured) by the mobile device or the wireless network for signal quality. The signal quality of the signaling connection can be based on one or more measures, such as received signal strength, received signal to interference ratios, or similar signal quality metrics. The estimated signal quality can be compared with a pre-determined signal quality threshold in step 806. When the signal quality exceeds the pre-determined threshold, then a probability of signaling messages being corrupted in transmission can be low. In step 812 a signaling message can be transmitted.

When the estimated signal quality of the signaling connection falls below the pre-determined threshold as determined in step 806, then a signaling message for the data connection intended for transmission to the mobile device by the wireless network can be delayed in step 808 by the wireless network. In step 810, the wireless network can determine if the voice connection is still active. When the voice connection remains active with the data connection, the steps of estimating and comparing signal quality against the pre-determined signal quality threshold can be repeated. If the signal quality has improved as determined in step 806 then the delayed signaling message can be transmitted in step 812, otherwise the signaling message can continue to be delayed by the wireless network until the voice connection terminates.

Figure 9:
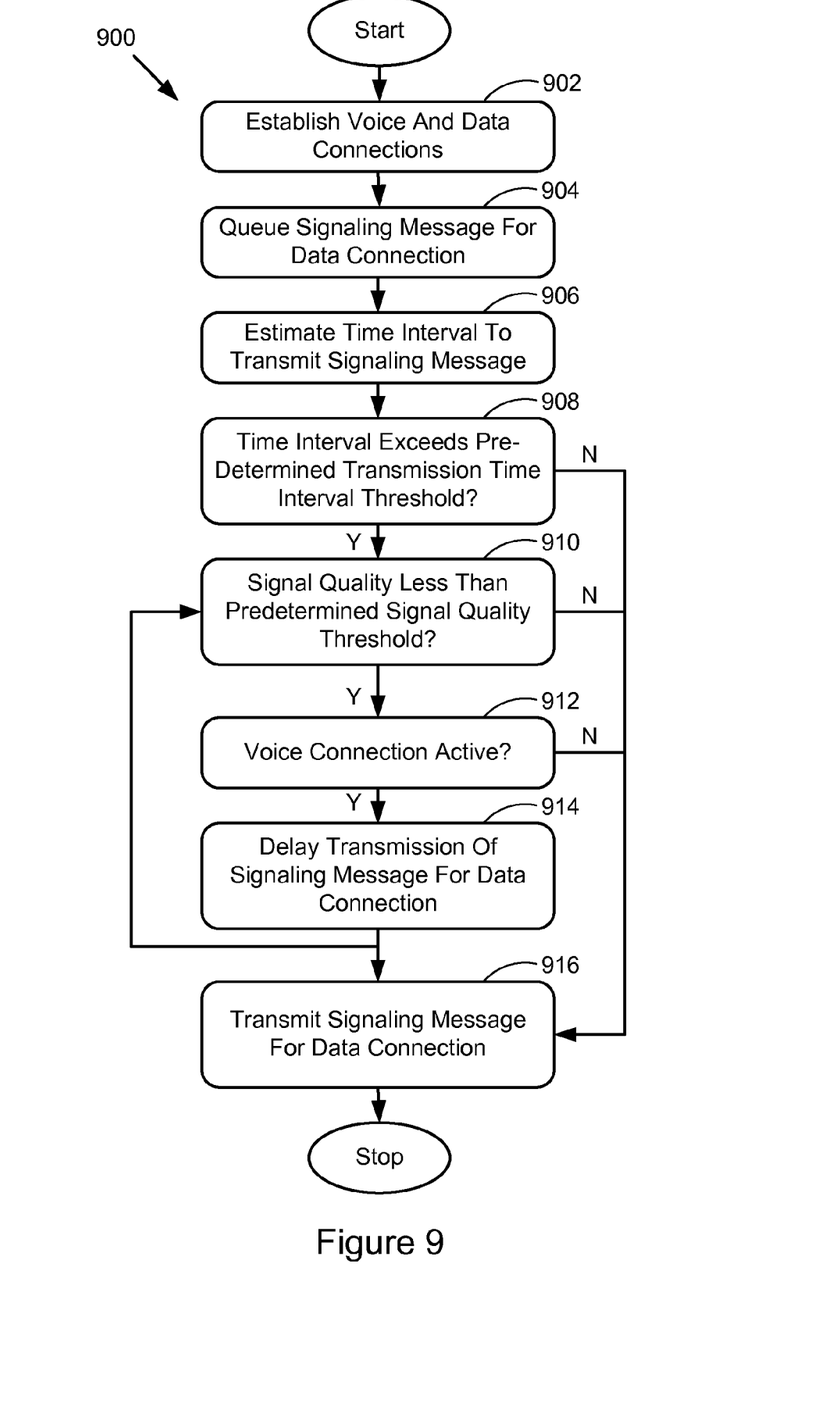

FIG. 9 illustrates yet another embodiment of a method 900 to manage radio resources between a mobile device and a wireless network. In step 902, a voice connection and a data connection can be established between the mobile device and the wireless network. The voice connection and the data connection can use separate radio resources, such as different radio access bearers. In step 904, the wireless network can queue a signaling message for the data connection. In step 906, the wireless network can estimate a time interval required to transmit the signaling message to the mobile device. In step 908, the estimated time interval can be compared with a pre-determined time interval threshold. If the time interval required to transmit the signaling message for the data connection does not exceed the pre-determined transmission time interval threshold, then in step 916, the wireless network can transmit the signaling message for the data connection to the mobile device. If, however, in step 908 the estimated time interval exceeds the pre-determined transmission time interval threshold, then in step 910, the signal quality of a connection between the wireless network and the mobile device can be compared with a pre-determined signal quality threshold. The signal quality can include any of a signal strength, a signal to noise/interference ratio, a signal quality metric or other signal quality measured by the mobile device or the wireless network. If the signal quality does not fall below the pre-determined signal quality threshold, then the wireless network can transmit the signaling message for the data connection in step 916. If the signal quality is less than the pre-determined signal quality threshold, then in step 912, the wireless network can determine if the voice connection is active. If the voice connection has terminated, then the signaling message can be transmitted in step 916. Otherwise, the wireless network can delay transmission of the signaling message in step 914. The signaling message can remain delayed by the wireless network while the signal quality falls below the pre-determined signal quality threshold and the voice connection remains active.

By delaying signaling messages during a simultaneous voice and data connection, particularly when signal quality between the mobile device and the wireless network is low, the wireless network can minimize the probability of releasing the voice connection due to being unable to transmit successfully the signaling message. Signaling messages that pertain to the data connection, such as those that require multiple protocol data units or a long time interval to transmit, can be prone to errors when transmitted on connections with weak signal quality. A user of the mobile device can tolerate a delay in changes to the data connection until signal quality conditions improve or until the voice connection terminates. An inadvertent release of the voice connection because of errors in signaling for a concurrent data connection can be thus avoided or minimized.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for managing radio resources between a mobile wireless device and a wireless network, the method comprising:
    detecting by a network subsystem in the wireless network simultaneous voice and data connections between the mobile wireless device and the wireless network; and
    delaying by the network subsystem and not transmitting a signaling message for the data connection until after the voice connection terminates;
    wherein the data connection uses a packet switched radio access bearer, and the signaling message is a radio bearer reconfiguration message, wherein the signaling message requires a plurality of data link layer protocol data units for transmission from the radio network subsystem to the mobile wireless device.

2. The method as recited in claim 1, wherein the signaling message requires more than 100 ms for transmission from the radio network subsystem to the mobile wireless device.

3. The method as recited in claim 1, wherein the data connection uses a high speed packet access packet switched radio access bearer, and the signaling message for the data connection reconfigures or releases the high speed packet access packet switched radio access bearer.

4. The method as recited in claim 1, further comprising:
    estimating a signal quality for a signaling connection between the mobile wireless device and the wireless network; and
    delaying and not transmitting the signaling message until after the voice connection terminates only when the estimated signal quality is less than a pre-determined signal quality threshold.

5. The method as recited in claim 4, wherein the estimated signal quality measures at least one of a received signal strength, a received signal code power and a received signal to interference ratio at the mobile wireless device.

6. The method as recited in claim 1, further comprising:
    estimating a time to transmit the entire signaling message from the radio network subsystem to the mobile wireless device; and
    delaying and not transmitting the signaling message until after the voice connection terminates only when the estimate time to transmit the entire signaling message exceeds a time interval threshold.

7. A method for managing radio resources between a mobile wireless device and a wireless network, the method comprising:
    establishing a voice connection between the mobile wireless device and the wireless network;
    establishing a data connection between the mobile wireless device and the wireless network, the data connection being configured to support a variable data rate transmission based on a dynamic bandwidth allocation; and
    restricting reconfiguration of the data connection until the voice connection terminates;
    wherein the reconfiguration of the data connection includes changing a data rate allocated to the data connection.

8. The method as recited in claim 7, wherein the reconfiguration of the data connection includes downgrading the data connection from a variable data rate to a fixed data rate.

9. The method as recited in claim 7, wherein the reconfiguration of the data connection requires a plurality of data link layer protocol data units for transmission from the wireless network to the mobile wireless device.

10. The method as recited in claim 7, wherein the reconfiguration of the data connection requires at least 100 ms to complete.

11. The method as recited in claim 7, wherein the voice connection is a circuit switched connection, and the data connection is a packet switched connection based on a high speed packet access radio bearer.

12. The method as recited in claim 11, further comprising delaying a downgrade of the packet switched connection from a high speed packet access radio bearer to a Release 99 radio bearer until after the voice connection terminates.

13. The method as recited in claim 7, further comprising delaying a release of radio resources used by the data connection until the voice connection terminates.

14. The method as recited in claim 7, wherein establishing the data connection includes upgrading an existing data connection based on a Release 99 radio bearer to use a high speed packet access radio bearer.

15. A non-transitory computer readable medium for storing non-transitory computer program code executed by a processor for controlling radio resources between a wireless network and a mobile wireless device, the non-transitory computer readable medium comprising:
- non-transitory computer program code for establishing a voice connection between the mobile wireless device and the wireless network;
- non-transitory computer program code for establishing a data connection between the mobile wireless device and the wireless network, the data connection being concurrently active with the voice connection;
- non-transitory computer program code for estimating a time interval to transmit successfully a signaling message to the mobile wireless device; and
- non-transitory computer program code for delaying transmission of the signaling message when the estimated time interval exceeds a pre-determined transmission time interval threshold and the voice and data connections remain concurrently active.

16. The non-transitory computer readable medium as recited in claim 15, wherein the data connection uses a packet switched radio access bearer, and the signaling message is a radio bearer reconfiguration message.

17. The non-transitory computer readable medium as recited in claim 15, wherein the signaling message requires a plurality of data link layer protocol data units for transmission from the wireless network to the mobile wireless device.

18. The non-transitory computer readable medium as recited in claim 15, wherein the signaling message requires more than 100 ms for transmission from the wireless network to the mobile wireless device.

19. The non-transitory computer readable medium as recited in claim 15, further comprising:
- non-transitory computer program code for estimating a signal quality of a signaling connection between the mobile wireless device and the wireless network; and
- non-transitory computer program code for delaying transmission of the signaling message on the signaling connection only when the estimated signal quality is less than a pre-determined signal quality threshold.

20. The non-transitory computer readable medium as recited in claim 19, wherein the estimated signal quality measures at least one of a received signal strength, a received signal code power and a received signal to interference ratio at the mobile wireless device.

21. The non-transitory computer readable medium as recited in claim 15, wherein the delayed signaling message changes a fixed data rate of a radio bearer allocated to the data connection.

22. The non-transitory computer readable medium as recited in claim 15, wherein the delayed signaling message releases a radio bearer allocated to the data connection.

* * * * *